US012624659B2

(12) United States Patent
Pellerin et al.

(10) Patent No.: US 12,624,659 B2
(45) Date of Patent: May 12, 2026

(54) AIR PURGING ARRANGEMENT

(71) Applicant: PRATT & WHITNEY CANADA CORP., Longueuil (CA)

(72) Inventors: Hugues Pellerin, Montreal (CA); Eric Langevin, Lery (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/795,271

(22) Filed: Aug. 6, 2024

(65) Prior Publication Data

US 2026/0043349 A1 Feb. 12, 2026

(51) Int. Cl.
| *F01D 25/18* | (2006.01) |
| *F02C 7/06* | (2006.01) |
| *F16N 39/00* | (2006.01) |

(52) U.S. Cl.
CPC ............... *F02C 7/06* (2013.01); *F01D 25/18* (2013.01); *F16N 39/002* (2013.01); *F05D 2220/32* (2013.01); *F05D 2260/98* (2013.01)

(58) Field of Classification Search
CPC ........... F02C 7/06; F01D 25/18; F01M 13/00; F01M 13/0011; F01M 13/0038; F16N 39/002; F16N 39/005
See application file for complete search history.

(56) References Cited

U.S. PATENT DOCUMENTS

| | | | | |
|---|---|---|---|---|
| 1,342,063 A | * | 6/1920 | Perry | .................... F16N 39/005 |
| | | | | 184/6.24 |
| 2,245,198 A | * | 6/1941 | Hunter | ................... B64D 37/22 |
| | | | | 244/135 R |
| 2,531,411 A | * | 11/1950 | Davenport | .............. F01D 25/18 |
| | | | | 417/372 |
| 2,723,002 A | * | 11/1955 | Garnier | ............... F16H 57/0434 |
| | | | | 184/6.12 |
| 2,942,611 A | * | 6/1960 | Klank, Jr. | .................. F15B 1/26 |
| | | | | 244/135 R |
| 3,685,528 A | * | 8/1972 | Holland | ................ F16K 24/046 |
| | | | | 137/43 |
| 4,052,852 A | | 10/1977 | Hart | |
| 4,346,786 A | * | 8/1982 | Midgley | .............. F01M 11/067 |
| | | | | 184/6.4 |
| 4,660,376 A | * | 4/1987 | Johnson | ................ F01K 21/047 |
| | | | | 60/39.53 |
| 4,887,424 A | * | 12/1989 | Geidel | .................... F01D 25/20 |
| | | | | 416/174 |

(Continued)

OTHER PUBLICATIONS

European Search Report issued in counterpart EP application No. 25194433.6 on Jan. 19, 2026.

*Primary Examiner* — Minh Truong
(74) *Attorney, Agent, or Firm* — NORTON ROSE FULBRIGHT CANADA LLP

(57) ABSTRACT

An aircraft engine fluid system comprises an open fluid circuit connected to a tank for distributing a fluid to a plurality of components. A component of the plurality of components has an enclosure having an internal chamber with an inlet port and an outlet port fluidly connected to the fluid circuit. The outlet port is positioned at a bottom end of the internal chamber. An outlet port extension tube extends upwardly from the outlet port to a top end of the internal chamber. The outlet port extension tube has a top open end fluidly connecting the top end of the internal chamber to the outlet port.

13 Claims, 6 Drawing Sheets

(56) References Cited

U.S. PATENT DOCUMENTS

| | | | | |
|---|---|---|---|---|
| 5,458,101 | A * | 10/1995 | Crooks | F01M 13/00 |
| | | | | 123/196 S |
| 5,577,575 | A * | 11/1996 | Mielo | F16N 39/06 |
| | | | | 95/254 |
| 7,367,427 | B2 * | 5/2008 | Gaines | F01D 25/18 |
| | | | | 184/6.24 |
| 9,878,822 | B2 * | 1/2018 | Barnes | B65D 25/38 |
| 10,539,076 | B2 * | 1/2020 | Niergarth | F16N 9/02 |
| 12,031,463 | B1 | 7/2024 | Mcgray | |
| 2007/0163444 | A1 | 7/2007 | Eliasson | |
| 2015/0292371 | A1 * | 10/2015 | Barnes | F01M 11/03 |
| | | | | 123/196 A |
| 2021/0131322 | A1 | 5/2021 | Nifenecker et al. | |
| 2022/0025781 | A1 * | 1/2022 | Jakab | F02C 7/32 |
| 2024/0159164 | A1 | 5/2024 | Lhomme et al. | |

* cited by examiner

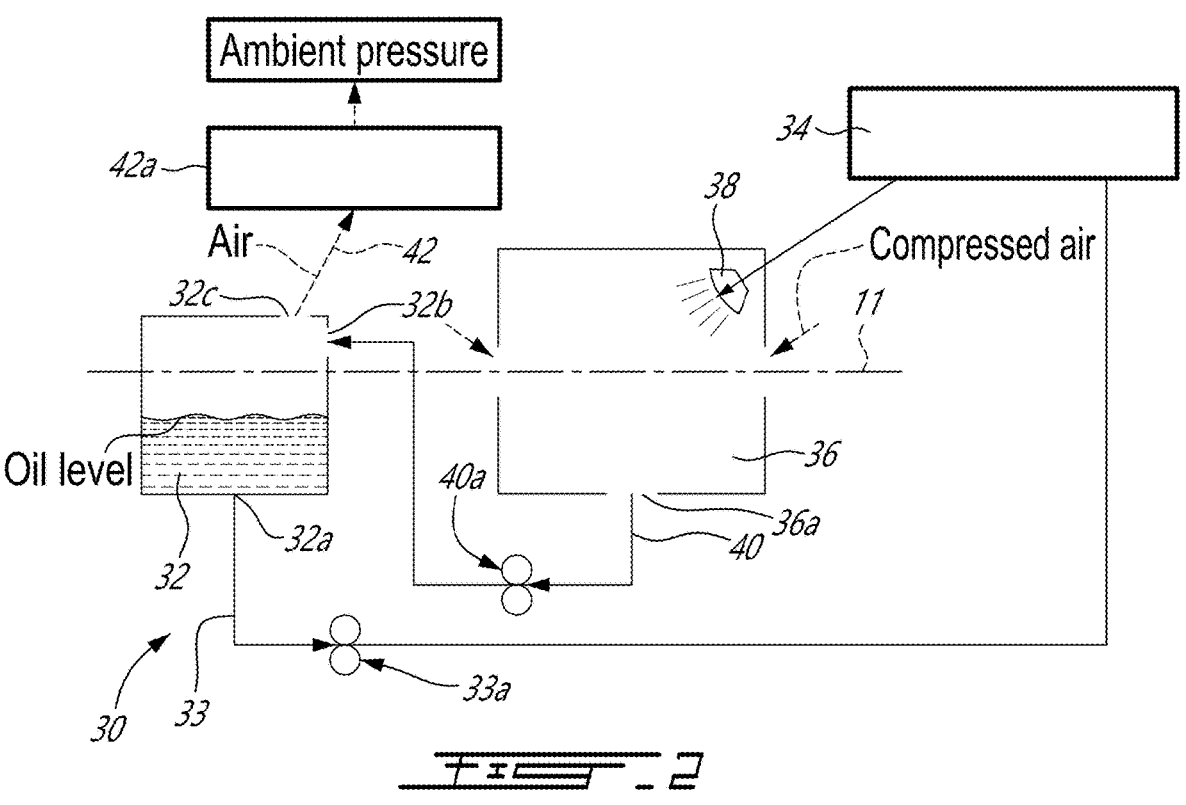
_FIG. 2_
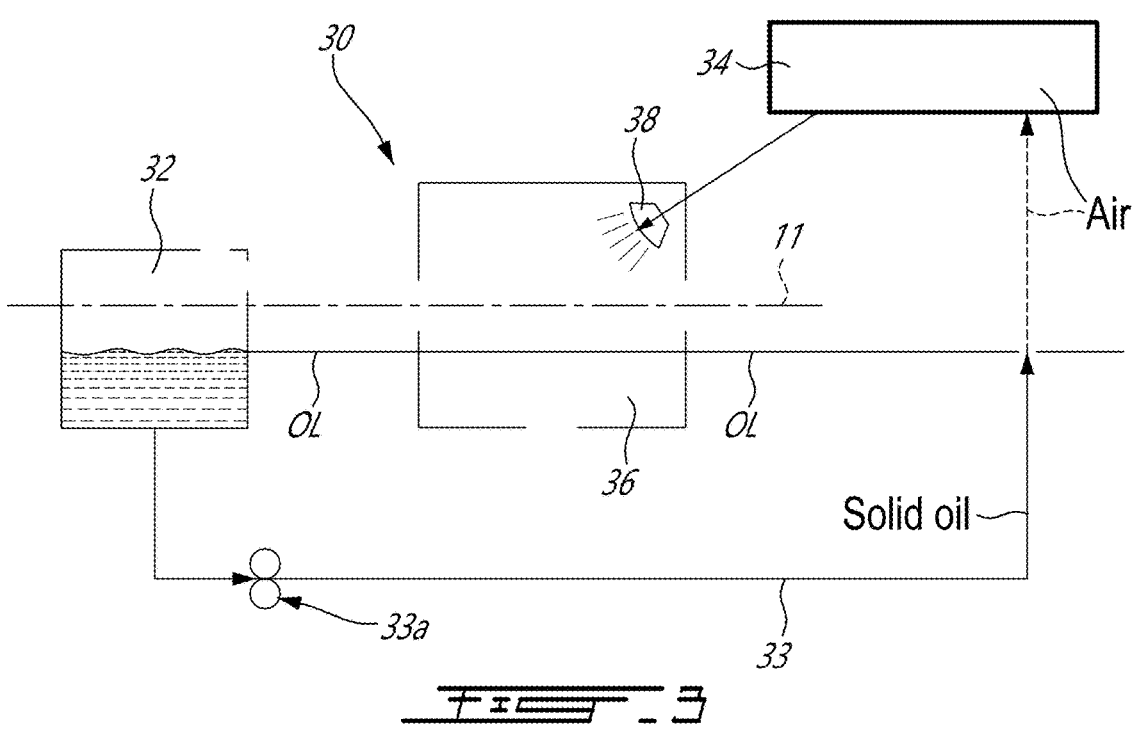
_FIG. 3_

Air purges

Gravity vector

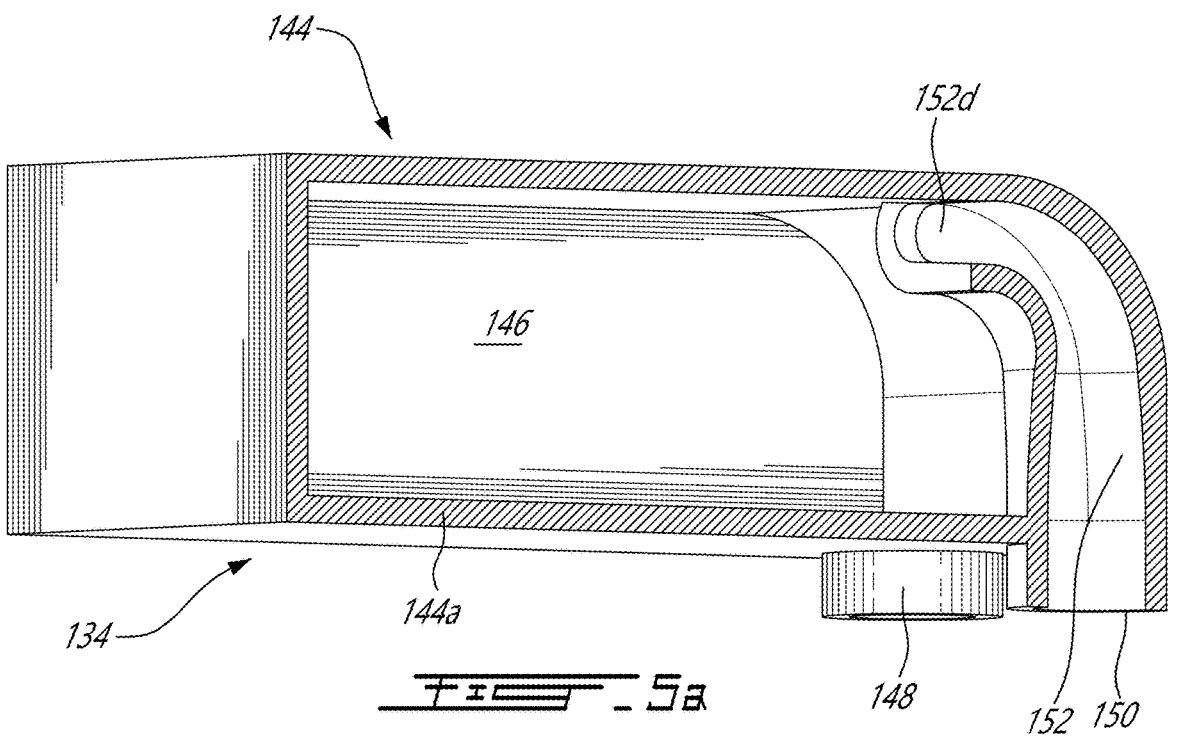
_FIG_5a_
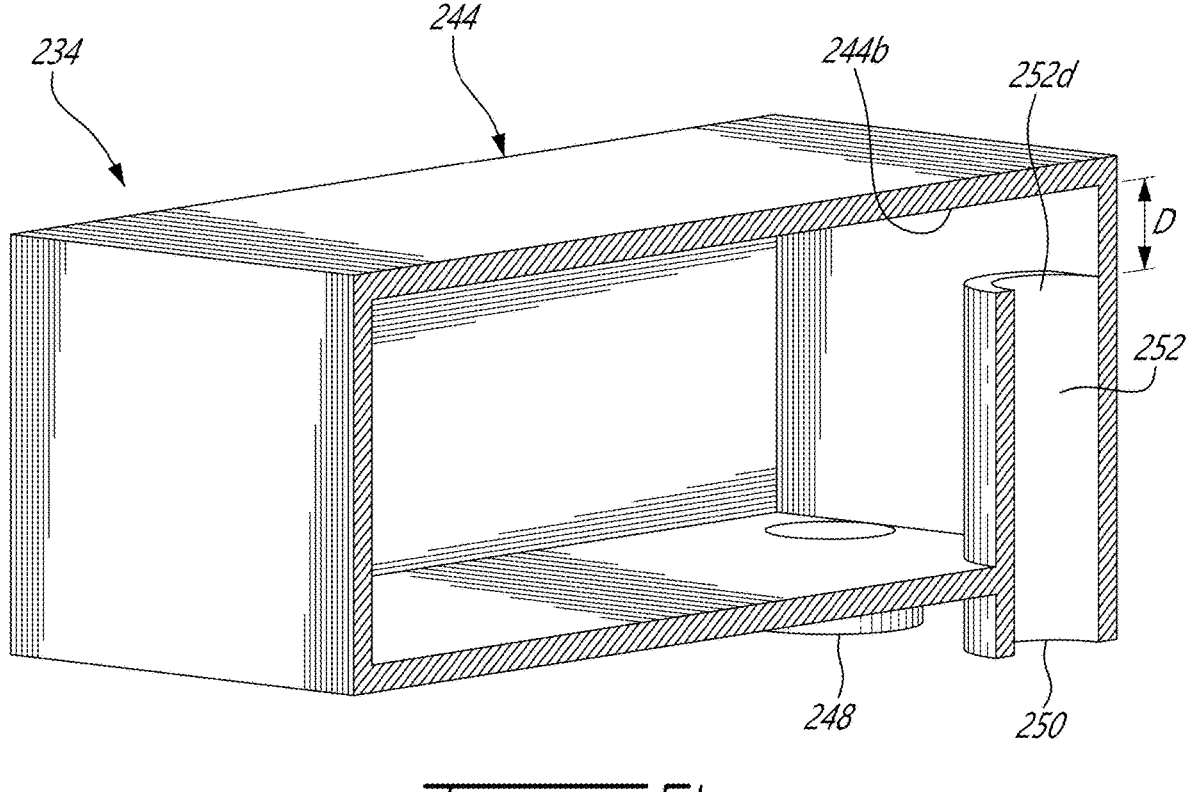
_FIG_5b_

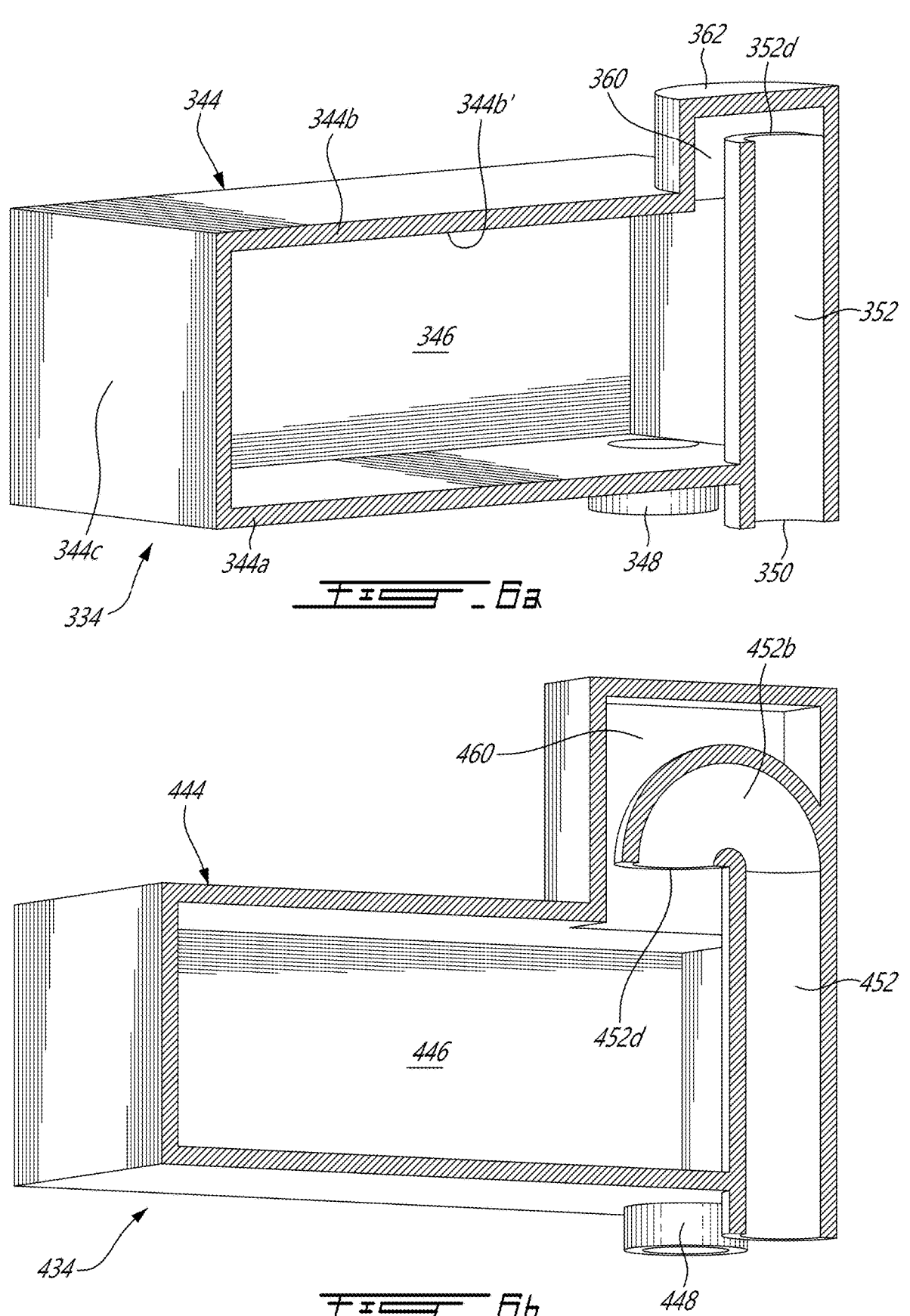

AIR PURGING ARRANGEMENT

TECHNICAL FIELD

The application relates generally to aircraft engines and to fluid systems of such engines and, more particularly, to systems and methods for purging air from components of aircraft engine fluid systems.

BACKGROUND OF THE ART

Some components of aircraft engine require oil for lubricating and/or cooling such components. In some cases, the oil that has been used for lubricating and/or cooling is directed toward a tank to remove air from the oil. While suitable for their intended purposes, improvement of such systems is however sought, particularly with respect to their ability to remove air from components of the system.

SUMMARY

In one aspect, there is provided an aircraft engine comprising: a plurality of components; and an oil system for distributing oil to the plurality of components. A component of the plurality of components includes: an enclosure including an internal chamber having an inlet port and an outlet port fluidly connected to the oil system, the outlet port provided at a first location on the enclosure, and an extension tube extending upwardly from the outlet port to a second location inside the internal chamber, the second location at a higher elevation than the first location when the aircraft engine is in a horizontal orientation.

In another aspect, there is provided an aircraft engine comprising an oil system fluidly connected to a plurality of components. A component of the plurality of components includes: an enclosure including an internal chamber having an inlet port and an outlet port fluidly connected to the oil system, the outlet port positioned at a bottom end of the internal chamber, and an extension tube disposed inside the internal chamber and extending upwardly from the outlet port to a top end of the internal chamber, the extension tube fluidly connecting the internal chamber to the outlet port.

In a further aspect, there is provided an aircraft engine fluid system comprising: an open-looped fluid circuit for distributing a fluid to a plurality of components, the open-loop fluid circuit including a fluid tank. A component of the plurality of components is disposed at a higher elevation than the fluid tank when the aircraft engine is in a horizontal orientation. The component includes: an enclosure having an internal chamber with an inlet port and an outlet port fluidly connected to the open-looped fluid circuit, the outlet port positioned at a bottom end of the internal chamber, and an outlet port extension tube extending upwardly from the outlet port to a top end of the internal chamber, the outlet port extension tube having a top open end fluidly connecting the top end of the internal chamber to the outlet port.

DESCRIPTION OF THE DRAWINGS

Reference is now made to the accompanying figures in which:

FIG. 2 is a schematic view of the oil system of the aircraft engine of FIG. 1 shown in an active/operating condition;

FIG. 3 is a schematic view of the oil system with some element of the system omitted for clarity and shown in an engine shutdown condition;

FIGS. 5a and 5b are 3D cross-section views of the component in accordance with other embodiments of the disclosure;

FIGS. 6a and 6b are 3D cross-section views of the component in accordance with further embodiments of the disclosure.

DETAILED DESCRIPTION

Figure 1:
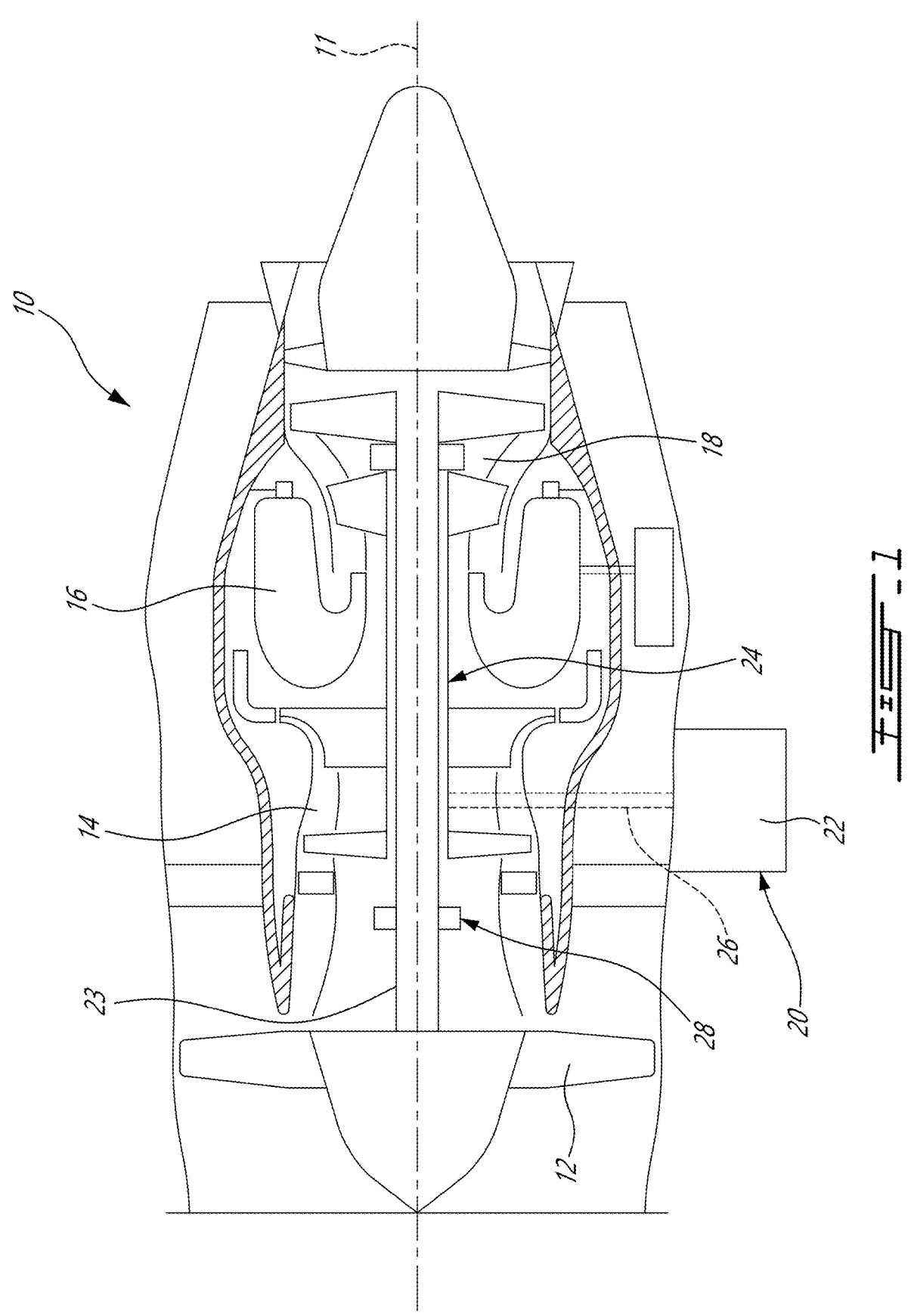
FIG. 1 is a schematic cross sectional view of an aircraft engine including an oil system.

FIG. 1 illustrates an aircraft engine 10 generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan 12, the compressor section 14, and the turbine section 18 are rotatable about a centerline 11 of the engine 10. The fan 12 is drivingly interconnected to low pressure rotor(s) of the turbine section 18 through a low pressure shaft 23, and the high pressure rotor(s) of the compressor section 14 is/are drivingly connected to high pressure rotor(s) of the turbine section 18 through a high pressure shaft 24 concentrically surrounding the low pressure shaft 23. Although the depicted engine 10 is a turbofan, it is understood that the present disclosure may apply to other aircraft engines, such as turboprops, turboshafts, and auxiliary power units (APU). It is also understood that the present disclosure is not limited to gas turbine engines and could be applied to other types of aircraft engines, such as electric hybrid aircraft engines, and compounded aircraft engines including internal combustion engines (e.g., Wankel engines) compounding power with the turbine section of a turbine engine and any variations thereof.

Still referring to FIG. 1, it can be appreciated that the engine 10 may include an accessory drive assembly 20, which includes an accessory gearbox (AGB) 22. Although not shown, the accessory drive assembly 20 can also include a pump assembly and/or a starter generator. The accessory drive assembly 20 may be driven by the high pressure shaft 24 via an accessory shaft 26 (e.g., a tower shaft) which drivingly interconnects the high pressure shaft 24 and the accessory gearbox 22. Bearings 28 may be used to rotatably support different components of the engine 10, such as the high- or low-pressure shafts 24, 23 and components of the AGB 22. Those bearings 28 may be located within bearing cavities, which may be connected to a source of lubricant for cooling and lubricating the bearings. In the description below, the terms "lubricant" and "oil" are used interchangeably.

Referring now to FIG. 2, an exemplary oil system suitable for use in the aircraft engine 10 is generally shown at 30. The oil system 30 generally comprises an oil tank 32 open to ambient and fluidly connected to an oil circuit including an oil delivery sub-system for feeding oil to components requiring lubrication and/or cooling. For instance, as shown in FIG. 2, the oil system 30 may include a main line 33 including a feed pump 33a fluidly connected to an outlet 32a of the tank 32 for feeding oil to one or more components or accessories 34 (e.g., a heat exchanger, a filter, a piston actuator, etc.) and/or one or more cavities 36, which may include a gearbox cavity of the AGB 22 and one or more bearing cavities containing some of the bearings 28 (FIG. 1), in negative pressure with respect to a main compressor of the engine 10. In some cases and as schematically depicted in FIG. 2, the one or more cavities 36 are connected to a source of compressed air, such as a stage of the compressor section 14, for maintaining a pressure outside the bearing cavities 36 greater than the pressure inside the cavities 36 to limit leakage of lubricant. Still referring to FIG. 2, one or more of the components, for instance, the accessory 34 may be located above the oil tank level and the engine centerline 11, and arranged for feeding the exemplified cavity 36 via suitable means, such as one or more nozzles 38 aiming at the cavity 36. The system 30 further include a scavenge line 40. According to some examples, the scavenge line may include a scavenge pump 40a fluidly connected to a scavenge outlet 36a at the bottom of the cavity 36 and to an inlet 32b at a top end of the oil tank 32 to return scavenged oil and any air trapped therein back into the oil tank 32 where a de-aeration process may naturally undergo after which the air is vented via a vent line 42 connected to an air outlet 32c at the top of the oil tank 32. However, it is understood that the scavenge line could adopt other configurations and could include less or more components. The vent line 42 may be configured to vent the air to ambient via a suitable fluid system exhaust module 42a. Alternatively, the oil system could be configured such as the oil system disclosed in U.S. Pat. No. 11,655,731 issued on May 23, 2023, the entire teachings of which is herein incorporated by reference. Both systems could be labeled as "open" oil systems given that the oil delivery sub-system discharges oil in a cavity composed of an air-oil mixture, which is open to ambient at engine shutdown. When such systems are inoperative, the oil nozzle and the tank have the same air pressure boundary condition (i.e., ambient pressure). This has the consequence that the oil level in the oil delivery sub-system will equalize with the oil tank level as schematically depicted in FIG. 3.

In the oil system 30 shown in FIGS. 2 and 3, the relative height between the accessory 34 and the oil tank level creates a delta pressure causing oil to drain from the accessory 34 when the engine 10 is shutdown. Even oil systems with an accessory placed lower than the oil level in the tank could be subjected to drainage at engine shutdown. In such systems, the delta pressure could be caused by transient events in the shutdown process, such as a hammer head effect due to valve closure or pump stoppage, or even air exchange between cavities through the oil delivery system as each cavity may exhibit different operating pressure.

As mentioned above and as shown FIG. 3, due at least in part to its height, the accessory 34 may be emptied from its oil content at engine shutdown. This may have the following consequences: 1) The accessory 34 may drain into the cavity 36, causing leakage outside of the cavity 36 or causing excessive oil return to the tank 32 when the engine 10 is restarted or demanding a high tank volume to refill the oil system 30 at a next engine startup; 2) The accessory is filled with air. This air needs to be purged out of the accessory 34 at the next engine startup for proper system operation. These problems are exacerbated when the accessory 34 contains a relatively large volume of oil such as in the case of a heat exchanger. This scenario also occurs when filling the oil system 30 for the first time or after system drainage.

Some oil systems with similar component positioning as FIGS. 2 and 3 may include anti-drainage features, such as anti-syphon loops or check valves between the nozzle 38 and the accessory 34 and/or between the main line 33 and the accessory 34 hence maintaining the accessory 34 full at shutdown. The accessory 34 could also be designed with its inlet and outlet ports both positioned at the top or near the top end of the accessory to maintain the accessory filled with oil and provide the desired air purging function. However, as the inlet and outlet ports location are not only guided by the oil system designer desires and may sometimes be dictated by other considerations and physical constraints of the engine, there is a need for an oil system architecture configured to reduce air entrapment and improved air-purge during priming of engine oil system irrespective of the constrains on the positioning of the accessory and its associated inlet and outlet ports.

Figure 4:
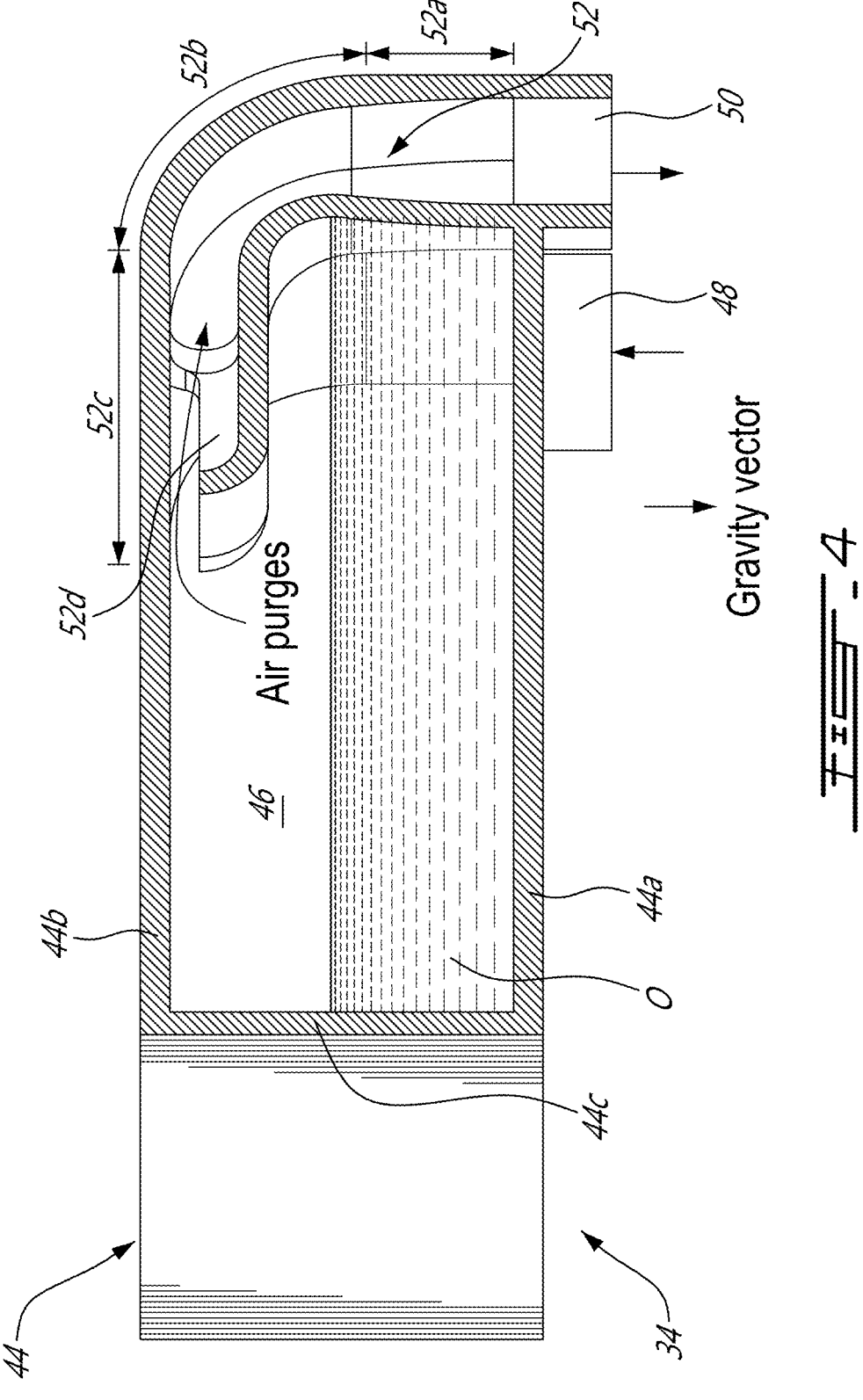
FIG. 4 is a 3D cross-section view of a component of the oil system in accordance with an embodiment of the present disclosure.

FIG. 4 illustrates an example of an oil system architecture than can be integrated to the accessory 34 of FIGS. 2 and 3, to hinder air entrapment inside the accessory. As will be seen hereinafter, air entrapment inside the accessory 34 may be prevented by raising the inlet opening of the outlet port as high as possible inside the internal volume of the accessory 34. In this way, air may be automatically purged from the accessory 34 via the outlet port as the oil fills up the internal volume of the accessory.

According to the embodiment shown in FIG. 4, the component or accessory 34 comprises an enclosure 44 having a bottom wall 44a, a top wall 44b and sidewalls 44c extending upwardly from the bottom wall 44a to the top wall 44b. The bottom wall 44a, the top wall 44b and the sidewalls 44c define therebetween an internal volume/chamber 46 adapted to be filled up with a pool or body of oil (O). The internal chamber 46 has an inlet port 48 and an outlet port 50 defined in a bottom end portion of the internal chamber 46, for instance, in the bottom wall 44a of the enclosure 44. The inlet port 48 and the outlet port 50 are respectively fluidly connected to the main line 33 and the nozzle 38 of the oil system 30. According to the illustrated example, the inlet port 48 and the outlet port 50 are both oriented in parallel to the gravity vector (i.e., the ports have a vertical orientation) with the inlet flow in opposite direction to gravity, and the outlet flow in the same direction as gravity. While various aspects of the present disclosure are particularly useful to avoid air entrapment in enclosures having such a port arrangement, it is understood that the orientation and position of the inlet port 48 and the outlet port 50 could differ from the port arrangement shown in FIG. 4. For instance, the inlet port 48 could be provided at the top of the internal chamber 46 and the outlet port 50 could still be provided in the bottom end portion of the internal chamber 46 (e.g., in the lower half portion of the chamber 46) but this time in one of the sidewalls 44c of the enclosure 44.

Still referring to FIG. 4, the accessory 34 further comprises an outlet port extension tube 52. The outlet port extension tube 52 may be provided in the form of an internal pipe extending upwardly from the outlet port 50 to a location adjacent to the top wall 44b inside the internal chamber 46. Still according to the embodiment illustrated in FIG. 4, the extension tube 52 has an upstanding portion 52a contiguous to an inner facing surface of one of the sidewalls 44c of the enclosure 44, an elbow 52b at a junction between the one of the sidewalls 44c and the top wall 44b of the enclosure 44, and a top transversal portion 52c extending away from the one of the sidewalls 44c in a direction parallel to the top wall 44b. The top transversal portion 52c is fluidly connected to the upstanding portion 52a via the elbow 52b. As shown in FIG. 4, the top transversal portion 52 has a top inlet opening 52d in fluid flow communication with the top end portion of the internal chamber 46. The top inlet opening 52*d* opens to the top end portion of the internal chamber 46 for evacuating the air floating above the body of oil O as the internal chamber 46 is filled up with oil. The top inlet opening 52*d* may have various configurations. In the case illustrated in FIG. 4, the top inlet opening 52*d* is provided in the form of an upwardly facing window defined in the top half of the top transversal portion 52*c* of the extension tube 52 and in close proximity to the top wall 44*b* of the enclosure 44. By so positioning and configuring the top inlet opening 52*d* of the extension tube 52 in a top tube portion extending parallel to the top wall 44*b* of the enclosure 44, it may be possible to maximize the inlet opening area of the tube 52. The upwardly facing window may extend from the terminal/distal end of the tube 52 along a major portion of a length of the top transversal portion 52*c* towards the elbow 52*b*. By further extending the top portion of the tube 52 in a direction transversal to the upstanding direction as shown in FIG. 4, it is possible to maximize the size of the inlet opening of the extension tube 52 to a value greater than the cross-sectional area of the upstanding portion 52*a* thereof. In some applications, this may facilitate the air purging operation.

FIG. 5*a* illustrates another embodiment of an enclosure 144 having an outlet port 150 defined in the bottom wall 144*a* of an enclosure 144 and an outlet port extension tube 152 extending upwardly from the outlet port 150 to a top inlet opening 152*d* inside the internal chamber 146. However, according to this embodiment, the top inlet opening 152*d* is defined in a terminal plane normal to the tube axis. FIG. 5*b* illustrates a further embodiment, in which the outlet port extension tube 252 is provided in the form of a straight upstanding pipe with a top open end 252*d* vertically aligned with the bottom outlet port 250 of the enclosure 244. As can be appreciated from FIG. 5*b*, the top open end 252*d* of the extension tube 252 is adjacent to but spaced from the top wall 244*b* of the enclosure 244 by a distance (D).

As shown in FIGS. 6*a* and 6*b*, it is also contemplated to position the top inlet opening of the extension tube above a working volume of the internal chamber of the accessory (e.g., the heat exchanger). FIG. 6*a* illustrates an embodiment in which the component or accessory has an enclosure 344 including a bottom wall 344*a*, a top wall 344*b* and sidewalls 344*c* extending upwardly from the bottom wall 344*a* to the top wall 344*b*. The bottom wall 344*a*, the top wall 344*b* and the sidewalls 344*c* jointly define an internal chamber 346. The top wall 344*b* has an inner baseline surface 344*b*'. The inner baseline surface 344*b*' defines the upper boundary of the working volume of oil inside the internal chamber 346. The internal chamber 346 is formed at the top end thereof with a volume extension 360 above the working volume. That is the internal chamber 346 has a volume extension 360 located at a higher elevation than the inner baseline surface 344*b*' of the top wall 344*b* of the enclosure 344. Conceptually, the volume extension 360 may be viewed has a recess in the inner baseline surface 344*b*' of the top wall 344*b* of the enclosure 344. According to some embodiments and as shown in FIG. 6*a*, the volume extension 360 may be provided in the form of a hat or cap 362 projecting upwardly from the top wall 344*b* of the enclosure 344. The hat or cap 362 can be integrally formed with the top wall 344*b* of the enclosure 344 in vertical alignment with the outlet port 350 in the bottom wall 344*a*. As shown in FIG. 6*a*, the outlet port extension tube 352 can be provided in the form of a straight internal pipe extending vertically from the outlet port 350 into the volume extension 360 above the top surface of the working volume as delimited by the baseline surface 344*b*' of the top wall 344*b* of the enclosure 344. The extension tube 352 has an upwardly facing inlet opening 352*d* that opens to the volume extension 360 for evacuating air from the internal chamber 346. It can be appreciated that the extension tube 352 acts as a "snorkel" to evacuate air above the volume of oil in the internal chamber 346. Note that according to some embodiments, the extension tube 352 could extend up to the inner surface of the hat or cap 362 and perforations could be provided in the portion of the extension tube 352 extending into the volume extension 360 to allow the air to flow from the volume extension 360 into the extension tube 352. In operation, any air trapped in the volume extension 360 should have minimal impact on the operation of the accessory 334 as such residual air is contained outside of the working volume of the accessory 334.

FIG. 6*b* illustrates another embodiment similar to the embodiment of FIG. 6*a* but in which the extension tube 452 has a "n"-shaped elbow 452*b* terminating at a downwardly facing inlet opening 452*d* inside the volume extension 460 of the internal chamber 446 of the enclosure 444. Such a curved tube configuration with a downwardly facing inlet opening may allow to pick up the outlet source (i.e., the air) in the working volume space. In the example depicted in FIG. 6*b*, where the downwardly facing inlet opening 452*d* is above the top boundary of the working volume of the internal chamber 446, residual air may remain trapped in the volume extension 460 above inlet opening 452 without flowing through the outlet port extension tube 452.

Figure 7:
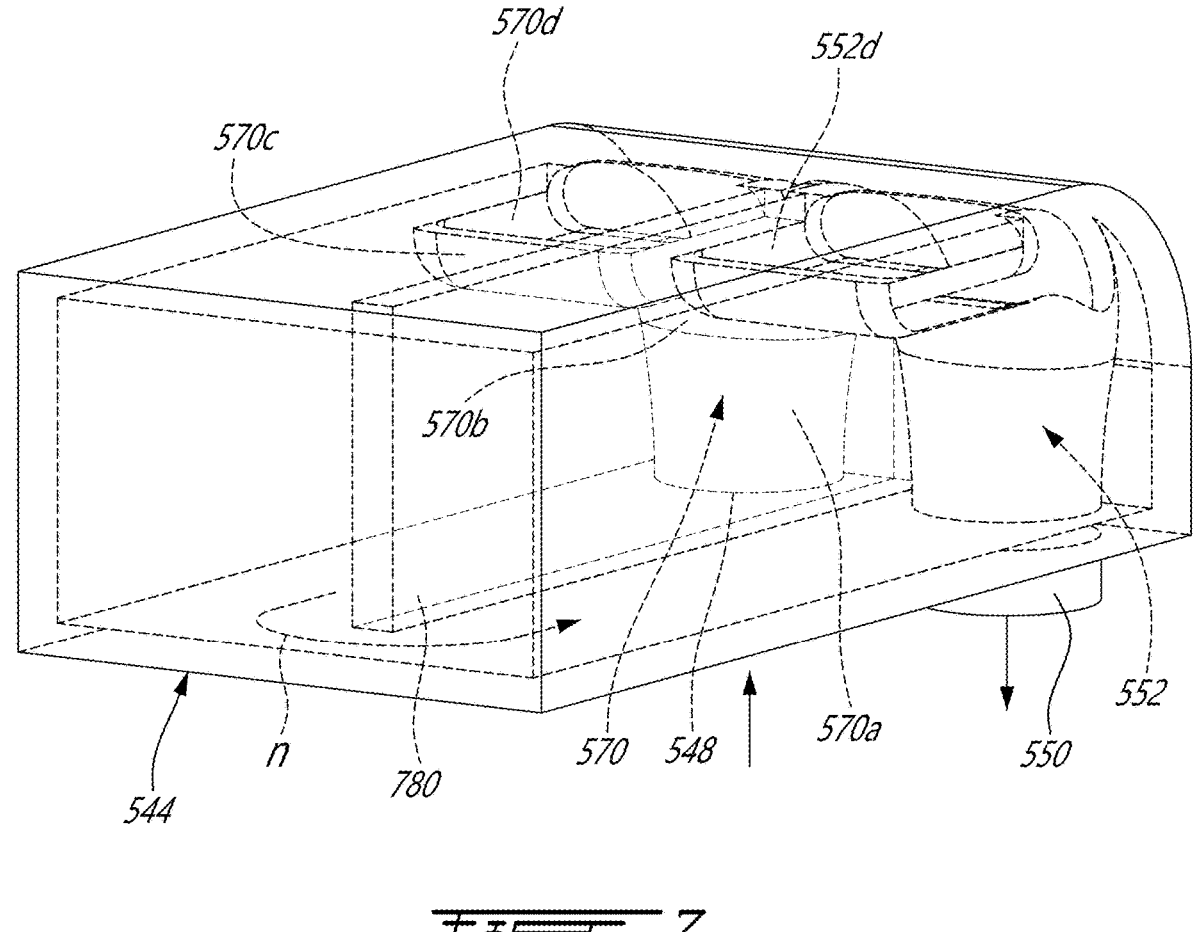
FIG. 7 is a 3D view of the component with the internal features thereof shown in dotted lines in accordance with a still further embodiment of the disclosure.

Turning to FIG. 7, it can be appreciated that an inlet port extension tube 570 can extend upwardly from the bottom inlet port 48, 148, 248, 348, 448 of any of the accessories 34, 134, 234, 334 and 434 shown in FIGS. 4-6 to prevent emptying of the accessories via their respective bottom inlet ports 48, 148, 248, 348, 448 at engine shutdown. In other words, it is contemplated to integrate an inlet port extension tube inside the accessory enclosures as a further means to maximize the retention of the oil inside the accessories at engine shutdown. The inlet port extension tube 570 can adopt various configurations, including any of the configurations of the above outlet port extension tubes 52, 152, 252, 352 and 452. According to the example illustrated in FIG. 7, the inlet port extension tube 570 has a trump-like configuration similar to that of the outlet port extension tube 52 depicted in FIG. 4. That is the inlet port extension tube 570 has upstanding portion 570*a*, an elbow or curved portion 570*b* and a top transversal portion 570*c* with a top facing window/opening 570*d* disposed at the top of the enclosure 544. By providing 2 extension tubes, namely one inlet port extension tube 570 and one outlet port extension tube 552 as shown in FIG. 7, it is possible to maintain the accessory full at engine shutdown (oil flow via the inlet port 548 and the outlet port 550 of the enclosure 544 is prevented due to the positioning of the top openings 552*d*, 570*d* of the extension tubes 552, 570 at the top of the enclosure 544) and to purge the air as the accessory is filled up.

The above described port extension tubes 52, 152, 252, 352, 452, 552 and 570 can be integrally formed with the enclosure of the accessories to form a one-piece component therewith. For instance, the port extension tubes 52, 152, 252, 352, 452, 552 and 570 could be molded as integral part inside the enclosure of the accessories or components.

A partition or wall feature 780 can also be provided inside the internal chamber of the enclosure 544 between the inlet and outlet port extension tubes 570, 552 to guide the oil flow through the working volume of the enclosure and, thus, avoid the oil to bypass the working volume.

It may be appreciated from the foregoing, that the provision of a port extension tube extending from an outlet port of an enclosure allows to have a self-purging component even when the outlet port thereof is disposed in a bottom end portion of the working volume of the component, such as in the bottom wall of the enclosure. By so repositioning the inlet opening of the outlet port in an upper end portion of the internal chamber irrespectively of the position of the outlet port on the enclosure, problems associated to air entrapment inside the component may be avoided in a simple and cost effective manner and that without the need for additional venting mechanisms including active components (e.g. valves), sensors, floaters, actuators and the like.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. The term "connected" or "coupled to" may therefore include both direct coupling (in which two elements that are coupled to each other contact each other) and indirect coupling (in which at least one additional element is located between the two elements).

It is further noted that various method or process steps for embodiments of the present disclosure are described in the preceding description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. The use of the indefinite article "a" as used herein with reference to a particular element is intended to encompass "one or more" such elements, and similarly the use of the definite article "the" in reference to a particular element is not intended to exclude the possibility that multiple of such elements may be present.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, while the various aspects of the present technology have been described in the context of a component of an oil system, it is understood that features of the present technologies are equally applicable to other aircraft engine fluid systems. Yet further modifications could be implemented by a person of ordinary skill in the art in view of the present disclosure, which modifications would be within the scope of the present technology.

The invention claimed is:

1. An aircraft engine comprising:
a plurality of components; and
an oil system for distributing oil to the plurality of components;
a component of the plurality of components including:
an enclosure including an internal chamber having an inlet port and an outlet port fluidly connected to the oil system, the outlet port provided at a first location on the enclosure, and an extension tube extending upwardly from the outlet port to a second location inside the internal chamber, the second location at a higher elevation than the first location when the aircraft engine is in a horizontal orientation, wherein the extension tube has an upstanding portion extending from the outlet port inside the internal chamber, a top portion extending in a transversal direction away from the upstanding portion, and an elbow between the upstanding portion and the top portion, the elbow provided at a junction of a sidewall and a top wall of the enclosure, the top portion of the extension tube extending parallel to the top wall.

2. The aircraft engine of claim 1, wherein the extension tube has an upwardly facing window-defined in the top portion of the extension tube and extending longitudinally along the top portion, and wherein the second location is at a top of the internal chamber.

3. The aircraft engine of claim 2, wherein the upwardly facing window in the top portion of the extension tube faces an inner surface of the top wall of the enclosure, the upwardly facing window laterally offset from the outlet port.

4. The aircraft engine of claim 1, wherein the extension tube is an internal pipe integrally formed with the enclosure.

5. The aircraft engine of claim 1, wherein the top portion of the extension tube has an inlet opening in a plane normal to an axis of the extension tube.

6. The aircraft engine of claim 1, wherein the inlet port and the outlet port are located at a bottom of the internal chamber, and wherein the component of the plurality of components further includes another extension tube extending upwardly from the inlet port to a third location at a top of the internal chamber.

7. The aircraft engine of claim 1, wherein the component of the plurality of components is positioned above a centerline of the aircraft engine.

8. The aircraft engine of claim 7, wherein the oil system is an open-looped system which is open to ambient at engine shutdown.

9. The aircraft engine of claim 8, wherein the outlet port and the inlet port are both defined in a bottom wall of the enclosure in parallel to a gravity vector.

10. The aircraft engine of claim 8, wherein the component of the plurality of components is a heat exchanger.

11. An aircraft engine comprising:

an oil system fluidly connected to a plurality of components;

a component of the plurality of components including:

an enclosure including an internal chamber having an inlet port and an outlet port fluidly connected to the oil system, the outlet port positioned at a bottom end of the internal chamber, and an extension tube disposed inside the internal chamber and extending upwardly from the outlet port to a top end of the internal chamber, the extension tube fluidly connecting the internal chamber to the outlet port, wherein a top wall of the enclosure has an inner baseline surface, wherein a recess is defined in the inner baseline surface of the top wall to define a volume extension, and wherein the extension tube extends into the recess.

12. The aircraft engine of claim 11, wherein the extension tube has a n-shaped elbow with an inlet opening facing downwardly inside the recess.

13. An aircraft engine fluid system comprising:

an open-looped fluid circuit for distributing a fluid to a plurality of components, the open-loop fluid circuit including a fluid tank; and wherein a component of the plurality of components is disposed at a higher elevation than the fluid tank when the aircraft engine is in a horizontal orientation, the component including:

an enclosure having an internal chamber with an inlet port and an outlet port fluidly connected to the open-looped fluid circuit, the outlet port positioned at a bottom end of the internal chamber, and an outlet port extension tube extending upwardly from the outlet port to a top end of the internal chamber, the outlet port extension tube having a top open end fluidly connecting the top end of the internal chamber to the outlet port, wherein the outlet port extension tube has an upstanding portion extending from the outlet port inside the internal chamber, a top portion extending in a transversal direction away from the upstanding portion, and an elbow between the upstanding portion and the top portion, the elbow provided at a junction of a sidewall and a top wall of the enclosure, the top portion of the outlet port extension tube extending parallel to the top wall.

* * * * *